United States Patent
Biskop

(10) Patent No.: US 10,744,729 B2
(45) Date of Patent: Aug. 18, 2020

(54) IDENTIFICATION SYSTEM FOR OPTICAL COMPONENTS

(71) Applicant: LUXEXCEL HOLDING B.V., Eindhoven (NL)

(72) Inventor: Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 0 days.

(21) Appl. No.: 15/833,583

(22) Filed: Dec. 6, 2017

(65) Prior Publication Data
US 2018/0162143 A1 Jun. 14, 2018

(30) Foreign Application Priority Data
Dec. 12, 2016 (EP) .................................. 16203419

(51) Int. Cl.
| | |
|---|---|
| *B29D 11/00* | (2006.01) |
| *B29C 64/112* | (2017.01) |
| *B33Y 10/00* | (2015.01) |
| *B33Y 80/00* | (2015.01) |
| *G02C 7/02* | (2006.01) |
| *B29C 64/10* | (2017.01) |

(52) U.S. Cl.
CPC ...... *B29D 11/00317* (2013.01); *B29C 64/112* (2017.08); *B33Y 10/00* (2014.12); *B33Y 80/00* (2014.12); *B29C 64/10* (2017.08); *G02C 7/021* (2013.01)

(58) Field of Classification Search
CPC . B29D 11/00317; B29C 64/112; B29C 64/10; B29C 64/393; B33Y 80/00; B33Y 10/00; G02C 7/021; B41J 3/4073
See application file for complete search history.

(56) References Cited

U.S. PATENT DOCUMENTS

| | | | | |
|---|---|---|---|---|
| 2001/0050753 A1* | 12/2001 | Tucker | ................. | G02C 7/021 351/159.74 |
| 2004/0130676 A1* | 7/2004 | Doshi | .............. | B29D 11/00317 351/159.25 |
| 2012/0019936 A1 | 1/2012 | Blessing et al. | | |
| 2014/0055740 A1 | 2/2014 | Spaulding et al. | | |
| 2015/0086754 A1 | 3/2015 | Van De Vrie et al. | | |

(Continued)

FOREIGN PATENT DOCUMENTS

| | | |
|---|---|---|
| EP | 2631686 A1 | 8/2013 |
| EP | 2636531 A1 | 9/2013 |

(Continued)

OTHER PUBLICATIONS

European Search Report for European Application No. 16203419.3 dated Mar. 31, 2017.

*Primary Examiner* — Geoffrey S Mruk

(74) *Attorney, Agent, or Firm* — The Dobrusin Law Firm, P.C.

(57) ABSTRACT

A method for printing an optical component, in particular an ophthalmic lens, by depositing droplets of printing ink side by side and one above the other in several consecutive printing steps by means of a print head, wherein the optical component is provided with an identifier indicating at least one lens parameter, wherein the identifier is structurally integrated into the optical component during at least one printing step. The present teachings further relate to a corresponding optical component.

19 Claims, 2 Drawing Sheets

(56) References Cited

U.S. PATENT DOCUMENTS

| | | |
|---|---|---|
| 2015/0093544 A1 | 4/2015 | Van De Vrie et al. |
| 2015/0093552 A1 | 4/2015 | Biskop et al. |
| 2015/0151461 A1 | 6/2015 | Ochromel |
| 2015/0153589 A1 | 6/2015 | Meschenmoser et al. |
| 2015/0253585 A1 | 9/2015 | Anatole et al. |
| 2016/0001414 A1 | 1/2016 | Dubois et al. |
| 2016/0101573 A1* | 4/2016 | Quere .................. B29C 64/106 264/1.1 |
| 2016/0161760 A1 | 6/2016 | Godot |
| 2017/0031059 A1 | 2/2017 | Valeri et al. |

FOREIGN PATENT DOCUMENTS

| | | |
|---|---|---|
| EP | 2846982 A1 | 3/2015 |
| EP | 2846983 A1 | 3/2015 |
| EP | 2846984 A1 | 3/2015 |
| WO | 2015/004208 A1 | 1/2015 |
| WO | 2015/092467 A1 | 6/2015 |

\* cited by examiner

IDENTIFICATION SYSTEM FOR OPTICAL COMPONENTS

FIELD

The present invention relates to a method for printing an optical component, in particular an ophthalmic lens, by depositing droplets of printing ink side by side and one above the other in several consecutive printing steps by means of a print head, wherein the optical component is provided with an identifier indicating at least one lens parameter.

BACKGROUND

Optical components are used in a wide range of products: microscopes, telescopes, cameras, eyeglasses and other ophthalmic devices, mirrors, etc. The supply chain usually involves manufacturers, eventually distributors, intermediaries, wholesalers, retailers and finally the end customer. The manufacturer provides customized and/or standardized optical blanks which are distributed to intermediaries which further process the optical blanks and integrate them into the final product which via wholesalers and retailers is delivered to the consumer.

Communication between different members of the supply chain as well as internal communication at each supply chain member requires the optical blanks to be identifiable. Communication may for example involve ordering, selection, delivery, inventory and/or retrieval processes.

Each optical blank is characterized through a set of lens parameters. Lens parameters comprise geometrical parameters, such as e.g. thickness and weight, optical parameters such as e.g. refractive index and Abbe value, or other lens parameters, such as e.g. expiration date and manufacturer name. Lens parameters comprise, but are not limited to, the parameters specified in the Vision Council Lens Description Standard, Version 2.1, July 2014. Typically, a fixed set of lens parameters together with a nominal value for each of these lens parameters together with an admissible deviation from the nominal value for each of these lens parameters is used to define a lens blank type. The definition of a lens blank type may differ between manufacturers.

To increase efficacy of the lens supply chain, between members as well as at each member, prior art document WO 2015/004208 A1 discloses a lens supply system for providing ophthalmic lenses with improved lens picking performance and/or lens manufacturing performance by providing the lens blank with an identifier wherein the identifier allows the subsequent retrieval of at least one geometrical parameter of the lens blank. In particular, the identifier allows the subsequent retrieval of the measured value of the at least one geometrical parameter instead of the nominal value of the at least one geometrical parameter.

It is common knowledge that products provided with optical components can be manufactured in a comparably time-saving and inexpensive way by printing the optical components directly on an appropriate substrate by using droplet-on-demand (DOD) inkjet printing technologies. Suchlike imprinted optical components comprise lenses, in particular ophthalmic lenses, mirrors or retroreflectors, for instance. The substrate can be made of synthetic material or glass. Furthermore, curing the imprinted material by using light irradiation for reducing the overall printing time is a well-known technique. For example, prior art documents EP 2 631 686 A1, EP 2 636 531 A1, EP 2 846 982 A1, EP 2 846 983 A1 and EP 2 846 984 A1 explain in detail how suchlike printing processes can be implemented.

SUMMARY

It is the purpose of the present invention to provide a method for providing optical components obtained through DOD inkjet printing technology with an identifier, increasing efficacy and efficiency of the lens supply chain for printed optical components.

The object of the present invention is achieved by a method for printing an optical component, in particular an ophthalmic lens, by depositing droplets of printing ink side by side and one above the other in several consecutive printing steps by means of a print head, wherein the optical component is provided with an identifier indicating at least one lens parameter, characterized in that the identifier is structurally integrated into the optical component during at least one printing step.

In the sense of the present invention, printing a three-dimensional optical component is carried out by depositing droplets of printing ink side by side and one above the other in several consecutive depositing steps by means of a print head, wherein in each depositing step a plurality of droplets is ejected simultaneously by a plurality of ejection nozzles of the print head.

By depositing droplets of printing ink side by side, a layer of printing ink is generated during each printing step. A pre-structure at a certain step of the printing process is the intermediate structure build up during printing steps preceding the certain step of the printing process from layers of printing ink deposited during the preceding printing steps.

As known from the prior art, the deposited droplets are at least partly cured after each depositing step in a curing step. The printing ink of the deposited droplets is either fully cured after each depositing step or only partly cured. In the second case, a final curing step is performed after finishing the three-dimensional optical component.

A printing step comprises at least one depositing step followed by at least one curing step. It is conceivable that further steps that are part of the printing step are carried out before and/or after the at least one depositing step. It is also conceivable that further steps that are part of the printing step are carried out before and/or after the at least one curing step.

Optical components in the sense of the present invention in particular comprise ophthalmic lenses, micro lenses, Fresnel structures, optical prisms and the like, which are made of multiple droplets of printing ink deposited by the print head.

Ophthalmic lenses are known from the prior art. In the sense of the present invention, an ophthalmic lens may be a progressive lens, e.g. a bifocal, trifocal or generally multifocal lens, or an ophthalmic lens may be a single-vision lens. An ophthalmic lens may also be a special-purpose lens. The lens may be finished or unfinished, e.g. semi-finished.

Semi-finished lenses are known from the prior art. A semi-finished lens comprises at least two surfaces, one of them is finished, generally the front surface, and one of them is unfinished, generally the back surface. The unfinished surface is intended for further machining, e.g. by forming, polishing and/or engraving, so as to have both surfaces finished in order to achieve a finished lens.

The printing ink comprises preferably transparent or trans-lucent printing ink. Preferably, the printing ink comprises an UV curable liquid monomer becoming a polymer if being cured. Preferably, the droplets are deposited onto a substrate. The substrate can be a part of the printed structure or a support plate for supporting the deposited droplets only during the printing process.

The print head is preferably movable relative to the deposited droplets in a moving step. It is conceivable that the print head is moved relative to the deposited droplets in a moving step performed between two subsequent depositing steps. Movement of the print head relative to the deposited droplets is preferably obtained by actively driving the print head, while the substrate on which the droplets are deposited preferably stands still, or by moving the substrate on which the droplets are deposited, while the print head preferably stands still. It is also conceivable that both the print head as well as the substrate are moved actively. However, the wording "moving the print head relative to the deposited droplets" in the sense of the present invention does not necessarily mean that the print head is actually moved, because alternatively the substrate on which the droplets are deposited can e.g. solely be moved to obtain the relative movement between the print head and the deposited droplets.

The printing data are provided to the printer be means of an intensity image. The intensity image preferably comprises a two-dimensional pattern of different grey or colour intensities. The pattern consists of different pixels, wherein each pixel represents a certain position in the three-dimensional structure to be printed. In particular, each pixel represents a certain position of a two-dimensional projection of the three-dimensional structure onto a flat base plane. The distribution of the intensity in the intensity image represents the shape of the three-dimensional structure to be printed as the intensity in each pixel is a value for the height of the three-dimensional structure at the corresponding position. The height of the printed three-dimensional structure in a certain position depends on the numberisize of droplets of printing ink and accordingly to the amount of printing material deposited in this position. The print head deposits printing ink in dependency of the intensity image, so that a three-dimensional structure is printed having the shape of the software based-virtual design given by the intensity image.

A lens parameter in the sense of the present invention is a geometrical parameter, an optical parameter or another parameter. Geometrical parameters in the sense of the present invention are parameters that describe geometrical properties of the lens. Geometrical parameters comprise, but are not limited to, front curvature radius, centre thickness, edge thickness etc. Optical parameters in the sense of the present invention are parameters that describe optical properties of the lens. Optical properties are all properties of the lens that determine the interaction of the lens with light. Optical parameters comprise, but are not limited to, refractive index, Abbe value, etc. Other parameters in the sense of the present invention are parameters that describe all properties of the lens that are neither geometrical nor optical properties of the lens. Other parameters comprise, but are not limited to, manufacturer name, expiration date, filter, coating material etc. Lens parameters in the sense of the present invention comprise, but are not limited to, all parameters listed in the Vision Council Lens Description Standard, Version 2.1 as of July 2014, the contents of which are incorporated herein by reference.

'Lens parameter' or simply 'parameter' in the scope of the present invention refers to a quantity, or to a value or to a quantity and its value. Preferably, the value is the measured value of the quantity. It is conceivable that the measured value also includes the accuracy of the measured value.

Alternatively, the value is the nominal value of the quantity. It is conceivable that the nominal value also includes the admissible deviation from the nominal value.

The identifier indicates at least one lens parameter. The identifier may be human-readable, e.g. provided in Latin letters and Arabic numbers, or the identifier may be machine-readable. Especially, the identifier may be a 1 D linear barcode, such as e.g. Code 39, or the identifier may be a 2D matrix code, such as e.g. Aztec Code, Data Matrix, EZcode or QR code, or the identifier may be a 3D code. The identifier may be an encryption key and/or the identifier may be a graphic image, e.g. an intensity image of the three-dimensional optical component. It is conceivable that the identifier is a holographic image.

According to the present invention, the optical component is being provided with the identifier during the printing, i.e. manufacturing, process. It is herewith advantageously possible to provide a printed optical component with an identifier without removing the printed optical component from the printing system. In particular, the means for providing the optical component with the identifier is part of the printing system. In this way, the optical component can be provided with an identifier in a time-saving and cost-saving way without the involvement of other units, either of the manufacturing chain or not of the manufacturing chain, apart from the printing unit.

Preferably, the identifier is being structurally integrated into the optical component.

According to a preferred embodiment of the present invention, in each printing step a layer of printing material is deposited onto a substrate in a depositing step and at least partially cured in a curing step in order to successively build up the optical component, wherein an identifier printing step for depositing the identifier onto an intermediate pre-structure of the optical component is performed between at least two subsequent printing steps in order to provide the identifier between at least two layers inside the optical component.

In the sense of the present invention, the identifier is deposited after at least one printing step onto the pre-structure built up during the preceding printing steps. After depositing the identifier onto the pre-structure at least one further printing step is carried out providing the pre-structure provided with the identifier with at least one further layer of deposited droplets. Herewith, the identifier is advantageously integrated into the optical component. The identifier is provided inside the optical component, i.e. in the sense of the present invention that at least one layer of printing material is deposited below the identifier and at least one layer of printing material is deposited above the identifier during the printing process. 'Below' and 'above' in the sense of the present invention are defined by the direction of flight of the deposited droplet, in particular the deposited droplets move from above to below.

It is herewith advantageously possible to provide a printed optical component with an identifier characterized in that the identifier is provided in the bulk of the optical component.

It is herewith advantageously possible to provide a printed optical component with an identifier that cannot be removed and/or altered without damaging and/or destroying the optical component.

Herewith the identifier is advantageously protected from wear and tear, as well as damage through other causes. The present invention therefore provides a resistant, reliable, long-lasting identifier for printed optical components. It is herewith advantageously possible to increase accuracy in lens picking and lens selection as errors due to unreadable identifiers are avoided.

Herewith the identifier is further advantageously protected from unauthorized manipulation by third parties. The present invention therefore provides forgery-proof identifier for printed optical components. In particular, the identifier may indicate information relating to the quality of the optical component, advantageously preventing fraud as all members of the supply chain can verify the quality of the provided optical component. Especially, retailers and, in the case of human-readable identifiers, the end consumer can verify that the actual quality and/or other specifications of the optical component coincide with the quality and/or other specifications indicated by the seller and/or distributor of the optical component or by the seller and/or distributor of the end product the optical component is a part of. In a preferred embodiment, the identifier indicates the manufacturer's brand name and/or logo, advantageously providing the optical component with a forgery-proof and effective means for branding.

In a preferred embodiment of the present invention, the droplets of printing ink deposited onto the intermediate pre-structure during the last printing step preceding the deposition of the identifier are only partially cured before depositing the identifier. It is herewith advantageously possible for the identifier to merge with the deposited droplets.

According to another preferred embodiment of the present invention, the identifier printing step comprises an identifier depositing step for depositing identifier printing ink onto the intermediate pre-structure and additionally an identifier curing step for at least partially curing the deposited identifier printing ink.

The printing of the identifier is carried out by depositing droplets of identifier printing ink side by side and one above the other in several consecutive identifier depositing steps by means of a print head, wherein in each identifier depositing step a plurality of identifier printing ink droplets is ejected simultaneously by a plurality of ejection nozzles of the print head onto the pre-structure built up during the preceding printing steps.

In a preferred embodiment of the present invention, the identifier print data are provided to the print head by means of an identifier black-and-white image. The identifier black-and-white image preferably comprises a two-dimensional pattern of black and white pixels wherein each pixel corresponds to one point on the surface of the pre-structure and wherein the pattern of black pixels takes the shape of the identifier and the pattern of white pixels poses the background against which the identifier shape is being displayed. In the identifier black-and-white image, black pixels encode points on the surface of the pre-structure where at least one droplet of identifier printing ink shall be deposited and white pixels encode points on the surface of the pre-structure where no droplet of identifier printing ink shall be deposited. The print head can be provided with the identifier printing data in a wired and/or wireless way.

The identifier can be build up during one single identifier depositing step, in this way providing an optical component with a single-layer identifier. Alternatively, the identifier can be build up during at least two identifier depositing steps, in this way providing an optical component with a multi-layer identifier.

According to a preferred embodiment of the present invention, the identifier printing ink comprises preferably transparent or trans-lucent printing ink. Preferably, the identifier printing ink comprises an UV curable liquid monomer becoming a polymer if being cured. Preferably, the droplets of identifier printing ink are deposited onto the pre-structure built up during the preceding printing steps.

In a preferred embodiment of the present invention, the identifier printing ink comprises at least one component that is visible to the human eye. For example, it is conceivable that the identifier printing ink comprises at least one colored component. In another embodiment of the present invention, the identifier printing ink comprises at least one component that is invisible to the human eye. For example, it is conceivable that the identifier printing ink comprises at least one component that is only visible to the human eye under irradiation with a certain radiation, e.g. under irradiation with black light (UV-A light). E.g. the identifier printing ink may comprise at least one fluorescent component. The identifier printing ink may comprise at least one component that reflects ultraviolet light and/or the identifier printing ink may comprise at least one component that absorbs ultraviolet light. The identifier printing ink may comprise at least one component that reflects infrared light and/or the identifier printing ink may comprise at least one component that absorbs infrared light. The identifier printing ink may comprise at least one magnetic component such that the identifier printing ink is magnetic. The identifier printing ink may comprise at least one component that is optically variable. In particular, the identifier printing ink may comprise at least one component that reflects various wavelengths in white light differently, depending on the angle of incidence of the light to the surface of the identifier printing ink. The identifier printing ink may comprise at least one component of holographic printing ink. For example, the identifier printing may comprise at least one component that is made of nanocrystalline titania.

The deposited droplets of identifier printing ink are at least partially cured during an identifier curing step. It is herewith advantageously possible to prevent the droplets to dissolve and melt way. It is herewith advantageously possible to provide an optical component with an identifier that is characterized in that its contours are sharp and precise. Advantageously, the identifier can be read out by humans and/or read out by machines with a high accuracy and low error rates.

It is conceivable that the optical behavior of the identifier printing ink is changed through the at least partial curing during the identifier curing step.

According to another preferred embodiment of the present invention, the identifier printing step is performed in such a manner that identifier printing ink that differs from the printing ink generating the layers from which the pre-structure is being generated, is used for building up the identifier.

It is conceivable that the identifier printing ink differs from the printing ink generating the layers from which the pre-structure is being generated in at least one physical parameter, wherein the physical parameters preferably comprise curing time, curing temperature, curing wavelength, viscosity, transmittance, absorption properties, electromagnetic properties and/or optical transparency. It is herewith advantageously possible to print the identifier of the optical component providing certain physical and/or optical effects compared to the remaining optical component, e.g. by printing the identifier with a magnetic identifier printing ink.

Herewith it is advantageously possible to adapt the properties of the identifier printing ink to the process requirements of the identifier printing step that may differ from the process requirements of the printing steps generating the layers that build up the optical component, e.g. curing time and curing temperature may be adjusted to take into account the differing process requirements of the identifier printing step. For example, by choosing an identifier printing ink with a curing time different from the curing time of the printing ink generating the layers that build up the optical component, the production time of the optical component can be optimized.

It is further advantageously possible to adapt the properties of the identifier printing ink to the product requirements of the identifier that may differ from the product requirements of the optical component, e.g. the requirements on contrast, layer thickness and printing accuracy of the identifier may differ from the requirements on contrast, layer thickness and printing accuracy of the optical component.

It is conceivable that during the identifier printing step at least a first and a second identifier printing ink is used. It is preferred that droplets of the first identifier printing ink are deposited onto the intermediate pre-structure built up during the preceding printing steps and droplets of a second identifier printing ink are deposited onto the intermediate pre-structure and/or onto the droplets of the first identifier printing ink. The first identifier printing ink may differ from the second identifier printing ink in at least one physical parameter, wherein the physical parameters preferably comprise curing time, curing temperature, curing wavelength, viscosity, transmittance, absorption properties, electromagnetic properties and/or optical transparency. It is herewith advantageously possible to print a first part of the identifier with a first set of physical properties and a second part of the identifier with a second set of physical properties. In particular, the first part of the identifier may be machine-readable and the second part of the identifier may be human-readable.

According to another preferred embodiment of the present invention, the identifier curing step is performed in such a manner that the deposited identifier is exposed to UV light with an exposure time, an intensity and/or a wavelength range differing from exposure time, intensity and/or wavelength range of the curing steps.

In order to build up the identifier, the droplets of identifier printing ink have to be deposited side by side and one above the other, preferably partly overlapping each other, so that the identifier forms a three-dimensional structure which influences electromagnetic radiation passing the identifier. The properties of the at least one deposited droplet of identifier printing ink can be changed by exposing the at least one deposited droplet of identifier printing ink to ultraviolet (UV) light. Exposure time, wavelength and intensity influence the properties, especially the optical properties, of the at least one deposited droplet of identifier printing ink.

Herewith it is advantageously possible to adapt the specifications of the identifier curing step to the process requirements of the identifier curing step that may differ from the process requirements of the curing steps of the intermediate pre-structure and/or optical component, e.g. exposure time and intensity of the UV light used in the identifier curing step may be adjusted to take into account the differing process requirements of the identifier curing step. It is further advantageously possible to adapt the specifications of the identifier curing step to the product requirements of the identifier that may differ from the product requirements of the optical component, e.g. the requirements on contrast and printing accuracy for the identifier may differ from the requirements on contrast and printing accuracy for the optical component.

Exposure to UV light alters the refraction index of the deposited droplets of identifier printing ink. Preferably, exposure to UV light may be used to modify the optical properties of the identifier. For example, the refractive index of the identifier depends on the exposure time, intensity and/or wavelength to UV light that the identifier is exposed to during the identifier curing step.

According to another preferred embodiment of the present invention, the identifier is at least partially cured with at least one UV-light source that emits UV light of differing intensity and/or with differing exposure time and/or wavelength at at least two different points on the identifier resulting in an anisotropic exposure of the identifier to UV light.

It is herewith advantageously possible to cure a first part of the identifier with a first exposure time, a first intensity and/or a first wavelength range and a second part of the identifier with a second exposure time, a second intensity and/or a second wavelength range. For example, the first part of the identifier may be printed using a first identifier printing ink with a first set of physical properties necessitating curing with an UV light of a first exposure time, a first intensity and/or a first wavelength range and the second part of the identifier may be printed using a second identifier printing ink with a second set of physical properties necessitating curing with an UV light of a second exposure time, a second intensity and/or a second wavelength range. In particular, the first part of the identifier may be machine-readable and the second part of the identifier may be human-readable.

Preferably, at least a first identifier printing ink is being ejected from at least a first ejection device and a second identifier printing ink is being ejected from a second ejection device, wherein the first identifier printing ink is curable by UV light of the exposure time, wavelength and/or intensity of a first UV light and wherein the second identifier printing ink is curable by UV light of the exposure time, wavelength and/or intensity of a second UV light.

According to another preferred embodiment of the present invention, in each printing step a layer of printing material is deposited onto a substrate in a depositing step and at least partially cured in a curing step in order to successively build up the optical component, wherein an identifier providing step for generating the identifier into the surface of an intermediate pre-structure of the optical component is performed between at least two subsequent printing steps in order to provide the identifier between at least two layers inside the optical component, wherein the identifier providing step comprises an identifier curing step for additionally curing the surface of the intermediate pre-structure.

In the sense of the present invention, the identifier is generated after at least one printing step during an identifier providing step. During the identifier providing step, a negative of the identifier is being printed, i.e. droplets of printing ink are deposited on all points on the surface of the pre-structure side by side and one above the other in several consecutive identifier depositing steps by means of a print head except at those points where the identifier shall be provided. Herewith, the identifier is provided as the area of the surface of the pre-structure that has not been covered with droplets of printing ink during the identifier providing step. Herewith, the identifier is provided into the surface of the pre-structure as opposed to the previously described embodiments of the present invention, where the identifier is provided onto the surface, i.e. printed on the pre-structure as a positive.

After the identifier providing step, at least one further printing step is carried out providing the pre-structure provided with the identifier with at least one further layer of deposited droplets. Herewith, the identifier is advantageously integrated into the optical component. The identifier is provided inside the optical component, i.e. in the sense of the present invention that at least one layer of printing material is deposited below the identifier and at least one layer of printing material is deposited above the identifier during the printing process. 'Below' and 'above' in the sense of the present invention are defined by the direction of flight of the deposited droplet, in particular the deposited droplets move from above to below. It is herewith advantageously possible to provide a printed optical component with an identifier characterized in that the identifier is provided in the bulk of the optical component. The identifier cannot be removed and/or be replaced by another identifier after the printing of the optical component is finished without damaging and/or destroying the optical component.

In a preferred embodiment of the present invention, the identifier provided in the identifier providing step may be filled with air or another gaseous substance. Alternatively, the identifier may be filled with identifier filling ink or the identifier may not be filled at all. Preferably, the identifier filling ink may differ from the printing ink in at least one physical parameter wherein the physical parameters preferably comprise curing time, curing temperature, curing wavelength, viscosity, transmittance, absorption properties, electromagnetic properties and/or optical transparency.

In a preferred embodiment of the present invention, the droplets of printing ink deposited onto the intermediate pre-structure during the last printing step preceding the identifier providing step are only partially cured before depositing the identifier. It is herewith advantageously possible for the droplets deposited during the printing step with the droplets deposited during the identifier providing step.

In a preferred embodiment of the present invention, the identifier print data are provided to the print head by means of an identifier black-and-white image, as described above. According to the present embodiment of the present invention, the identifier is printed as a negative, i.e. during the identifier providing step, at least one droplet of printing ink is deposited on the surface of the pre-structure at points corresponding to white pixels on the black-and-white image and no droplet of printing ink is deposited on the surface of the pre-structure at points corresponding to black pixels on the black-and-white image.

The print head can be provided with the identifier printing data in a wired and/or wireless way.

The identifier can be build up during one single identifier providing step, in this way providing an optical component with an inverse single-layer identifier, i.e. the identifier has the depth of a single layer of deposited droplets of printing ink. Alternatively, the identifier can be build up during at least two identifier depositing steps, in this way providing an optical component with an inverse multi-layer identifier, i.e. the identifier has the depth of multiple layers of deposited droplets of printing ink.

According to a preferred embodiment of the present invention, the printing ink used during the identifier providing step may differ from the printing ink generating the layers from which the optical component is being built. The printing ink used during the identifier providing step is referred to as identifier providing ink. Preferably, the identifier providing ink comprises transparent or trans-lucent printing ink. Preferably, the identifier providing ink comprises an UV curable liquid monomer becoming a polymer if being cured. It is conceivable that the identifier providing ink differs from the printing ink generating the layers from which the optical component is being built in at least one physical parameter wherein the physical parameters preferably comprise curing time, curing temperature, curing wavelength, viscosity, transmittance, absorption properties, electromagnetic properties and/or optical transparency.

According to another preferred embodiment of the present invention, in each printing step a layer of printing material is deposited onto a substrate in a depositing step and at least partially cured in a curing step in order to successively build up the optical component, wherein an identifier printing step for depositing the identifier onto the surface of the optical component is performed after the last printing step preceding the finalizing printing or wherein an identifier providing step for depositing the identifier into the surface of the optical component is performed after the last printing step preceding the finalizing printing steps. According to a preferred embodiment of the present invention, the identifier printing step is embedded into the last printing steps in such a manner that the identifier is integrated into the last layers of printing ink in the form of positive relief structure or the identifier providing step is embedded into the last printing steps in such a manner that the identifier is integrated into the last layers of printing ink in the form of negative relief structure The optical component is built from layers of droplets of printing ink wherein the droplets of printing ink are deposited side by side and one above the other. If the optical component generated in this way reaches the desired shape and exhibits the desired optical properties, the optical component is finalized during the finalizing printing steps. The finalizing printing steps may for example comprise printing of at least one top layer or at least one cover layer, final curing and coating.

After the last printing step preceding the finalizing printing steps, an identifier printing step for depositing droplets of identifier printing ink onto the surface of the optical component is performed. In an alternative embodiment of the present invention, after the last printing step preceding the finalizing printing steps, an identifier providing step for providing the identifier into the surface of the optical component is performed.

According to a preferred embodiment of the present invention, the identifier is printed onto the surface of the optical component during an identifier printing step by depositing droplets of identifier printing ink side by side and one above the other onto the surface of the optical component. Preferably, the identifier is being printed in a single identifier printing step. Herewith, an optical component with a single-layer identifier is provided, i.e. on the surface of the optical component a relief in the shape of the identifier is being provided characterized in that the identifier is being raised above the background plane defined by the surface of the optical component by the height of a single layer of deposited droplets of identifier printing ink. Alternatively, the identifier is being printed in multiple identifier printing steps. Herewith, an optical component with a multi-layer identifier is provided, i.e. on the surface of the optical component a relief in the shape of the identifier is being provided characterized in that the identifier is being raised above the background plane defined by the surface of the optical component by the height of multiple layers of deposited droplets of identifier printing ink. Preferably, the identifier is printed during an identifier printing step by depositing droplets of identifier printing ink side by side and one above the other onto the surface of the optical component. In the sense of the present invention, the identifier is provided onto the surface of the pre-structure. Herewith, the identifier is provided before the finalizing printing steps on top of the optical component as a layer with identifier printing ink on those points on the surface of the optical component where the identifier is located. Herewith an identifier is provided in a comparably ink-saving way.

It is conceivable that the identifier printing step is followed by an identifier curing step. The identifier curing step may be followed by an identifier filling step and/or an identifier coating step. During the identifier filling step, droplets of filling ink are located at least on one of the points on the surface of the optical component on which no droplet of identifier printing ink has been deposited during the identifier printing step. During the identifier coating step, the identifier is being covered with a coating.

According to an alternative preferred embodiment of the present invention, the identifier is provided into the surface of the pre-structure during an identifier providing step by depositing droplets of printing ink side by side and one above the other on all points on the surface of the optical component where the identifier is not located. Preferably, the identifier is being provided in a single identifier providing step. Herewith, an optical component with an inverse single-layer identifier is provided, i.e. on the surface of the optical component a counter-relief or negative relief in the shape of the identifier is being provided characterized in that the identifier is being lowered below the background plane defined by the surface of the layer of printing ink provided during the identifier providing step by the height of a single layer of deposited droplets of printing ink. Alternatively, the identifier is being provided in multiple identifier providing steps. Herewith, an optical component with a multi-layer identifier is provided, i.e. on the surface of the optical component a counter-relief or negative relief in the shape of the identifier is being provided characterized in that the identifier is being lowered below the background plane defined by the surface of the layer of printing ink provided during the identifier providing step by the height of multiple layers of deposited droplets of printing ink.

Preferably, the identifier is provided during an identifier providing step by depositing droplets of printing ink side by side and one above the other on all points on the surface of the optical component except at those points where the identifier is to be located. In the sense of the present invention, the identifier is provided into the surface of the pre-structure. Herewith, the identifier is provided before the finalizing printing steps on top of the optical component as a layer with printing ink missing at those points on the surface of the optical component where the identifier is located. Herewith an identifier is provided that is comparably robust to damage.

It is conceivable that the identifier providing step is followed by an identifier curing step. The identifier curing step may be followed by an identifier filling step and/or an identifier coating step. During the identifier filling step, droplets of filling ink are located at least on one of the points on the surface of the optical component on which no droplet of printing ink has been deposited during the identifier providing step. During the identifier coating step, the identifier is being covered with a coating.

It is also conceivable that an identifier preparation step is carried out after the last printing step preceding the finalizing printing steps and before the identifier printing step, or, in an alternative embodiment, before the identifier providing step.

During the identifier preparation step the surface of the optical component is being prepared for the printing and/or providing of the identifier. E.g. a layer of a substance may be printed onto the surface of the optical component that alleviates removal of the identifier at a later time.

In particular, the present embodiment of the present invention provides an optical component with an identifier wherein the identifier is located on the surface of the optical component. Herewith an optical component with an identifier is provided wherein the identifier is comparably easy to remove. E.g. the identifier may be removed through simple cleaning of the optical component.

Providing the optical component with a removable identifier is advantageous for identifiers encoding information that is only of temporary relevance or for identifiers indicating information that is only relevant for some members of the supply chain. E.g. the identifier may indicate information that is relevant only for the production step and that can be removed after the optical component has been implemented into the end product. In particular, the identifier may indicate information that is relevant only for the optician, as for example temporary lens markings as listed in the Vision Council Lens Marking Guide, Version 2.0 as of June 2014, the contents of which are incorporated herein by reference.

Alternatively, the identifier may be protected from damage through wear and tear through layers provided during the finalizing printing steps. It is also conceivable that during the identifier preparation step, a substance is deposited onto the surface of the optical component that hampers the removal of the identifier from the surface of the optical component.

In a preferred embodiment of the present invention, the identifier provided after the last printing step preceding the finalizing printing steps during an identifier printing step provides a relief structure that can be read off mechanically, in an alternative embodiment of the present invention, it is conceivable that the identifier provided after the last printing step preceding the finalizing printing steps during an identifier providing step provides a counter-relief structure that can be read off mechanically.

According to another preferred embodiment of the present invention, the negative relief structure is at least partially filled with an identifier printing ink that preferably differs from the printing ink generating the layers after the identifier providing step. In an alternative preferred embodiment of the present invention, interspaces of the positive relief structure are at least partially filled with printing ink after the identifier printing step.

In a preferred embodiment of the present invention, the identifier is printed onto the surface of the optical component during an identifier printing step by depositing droplets of identifier printing ink side by side and one above the other onto the surface of the optical component generated during the preceding printing steps. Herewith the surface of the optical component is advantageously provided with an identifier wherein the identifier is characterized in that it forms a relief structure or positive relief structure on the surface of the optical component. In a preferred embodiment of the present invention, the identifier printing step is followed by an identifier filling step. During the identifier filling step, the interspaces of the relief structure or positive relief structure are being at least partially filled with printing ink. Herewith it is advantageously possible to protect the identifier from damage and dirt accumulation.

In an alternative preferred embodiment of the present invention, the identifier is provided into the surface of the optical component during an identifier providing step by depositing droplets of printing ink side by side and one above the other into the surface of the optical component generated during the preceding printing steps. Herewith the surface of the optical component is advantageously provided with an identifier wherein the identifier is characterized in that it forms a counter-relief structure or negative relief structure in the surface of the optical component. In a preferred embodiment of the present invention, the identifier providing step is followed by an identifier filling step. During the identifier filling step, the counter-relief structure or negative relief structure is being at least partially filled with identifier printing ink.

Herewith it is advantageously possible to protect the identifier from damage and dirt accumulation.

The identifier printing ink used during the identifier filling step to fill the counter-relief structure or negative relief structure provided during the identifier providing step, may differ from the printing ink generating the layers that built up the optical component in at least one physical parameter wherein the physical parameters preferably comprise curing time, curing temperature, curing wavelength, viscosity, transmittance, absorption properties, electromagnetic properties and/or optical transparency.

According to another preferred embodiment of the present invention, the identifier printing step is performed in such a manner that the positive relief structure is build up with an identifier printing ink that differs from the printing ink generating the layers that build up the optical component According to a preferred embodiment of the present invention, the identifier printing ink comprises preferably transparent or translucent printing ink. Preferably, the identifier printing ink comprises an UV curable liquid monomer becoming a polymer if being cured. Preferably, the droplets of identifier printing ink are deposited onto the optical component built up during the preceding printing steps.

In a preferred embodiment of the present invention, the identifier printing ink comprises at least one component that is visible to the human eye. For example, it is conceivable that the identifier printing ink comprises at least one colored component. In an alternative embodiment of the present invention, the identifier printing ink comprises at least one component that is invisible to the human eye. For example, it is conceivable that the identifier printing ink comprises at least one component that is only visible to the human eye under irradiation with a certain radiation, e.g. under irradiation with black light (UV-A light). E.g. the identifier printing ink may comprise at least one fluorescent component. The identifier printing ink may comprise at least one component that reflects ultraviolet light and/or the identifier printing ink may comprise at least one component that absorbs ultraviolet light. The identifier printing ink may comprise at least one component that reflects infrared light and/or the identifier printing ink may comprise at least one component that absorbs infrared light. The identifier printing ink may comprise at least one magnetic component such that the identifier printing ink is magnetic. The identifier printing ink may comprise at least one component that is optically variable. In particular, the identifier printing ink may comprise at least one component that reflects various wavelengths in white light differently, depending on the angle of incidence of the light to the surface of the identifier printing ink. The identifier printing ink may comprise at least one component of holographic printing ink. For example, the identifier printing may comprise at least one component that is made of nanocrystalline titania.

Exposure to UV light alters the refraction index of the deposited droplets of identifier printing ink. Preferably, exposure to UV light may be used to modify the optical properties of the identifier. For example, the refractive index of the identifier depends on the exposure time, intensity and/or wavelength to UV light that the identifier is exposed to during the identifier curing step.

According to another preferred embodiment of the present invention, the identifier is exposed to UV light from at least one UV-light source that emits UV light of differing intensity and/or with differing exposure time and/or wavelength at at least two different points on the identifier resulting in an anisotropic exposure of the identifier to UV light.

It is herewith advantageously possible to cure a first part of the identifier with a first exposure time, a first intensity and/or a first wavelength range and a second part of the identifier with a second exposure time, a second intensity and/or a second wavelength range. For example, the first part of the identifier may be printed using a first identifier printing ink with a first set of physical properties necessitating curing with an UV light of a first exposure time, a first intensity and/or a first wavelength range and the second part of the identifier may be printed using a second identifier printing ink with a second set of physical properties necessitating curing with an UV light of a second exposure time, a second intensity and/or a second wavelength range. In particular, the first part of the identifier may be machine-readable and the second part of the identifier may be human-readable. Preferably, at least a first identifier printing ink is being ejected from at least a first ejection device and a second identifier printing ink is being ejected from a second ejection device, wherein the first identifier printing ink is curable by UV light of the exposure time, wavelength and/or intensity of a first UV light and wherein the second identifier printing ink is curable by UV light of the exposure time, wavelength and/or intensity of a second UV light.

Another object of the present invention is an optical component, in particular an ophthalmic lens, comprising an optical main body being built in an inkjet printing process of depositing droplets of printing ink side by side and one above the other in several consecutive printing steps, wherein the optical component comprises at least one identifier indicating at least one lens parameter, characterized in that the identifier is being structurally integrated into the optical main body during at least one printing step.

An object of the present invention is an optical component provided with an identifier wherein the identifier is provided within the main body of the optical component and wherein the identifier is structurally integrated into the optical component.

The definitions of 'optical component', 'identifier', 'lens parameter', 'structurally integrated' and 'printing step' have been given above. In the sense of the present invention, the optical main body of the printed optical component is comprised of all droplets of the optical component wherein the entire surface of the droplet is in contact with other droplets of printing ink. I.e. the optical main body is comprised of droplets of printing ink that are completely surrounded by other droplets of printing ink.

The surface of the optical component is comprised of all droplets that are not completely surrounded by other droplets of printing ink. I.e. the surface of the printed optical component is comprised of all droplets of the optical component wherein at least one point of the surface of the droplet is not in contact with other droplets of printing ink.

According to the present invention, the identifier is structurally integrated into the optical component, i.e. in the sense of the present invention that the identifier is provided as part of the printing process of the optical component. In particular, the identifier is provided by the same means and methods used for generating the optical component itself. The identifier is provided during the printing process of the optical component itself.

According to another embodiment of the present invention, the optical component comprises an identifier wherein the identifier is confined to a region of the optical component wherein the region of the optical component does not have an optical function.

In a preferred embodiment of the present invention, the identifier is confined to a region of the optical component. Preferably, the region to which the identifier is confined to, does not have an optical function. A region of an optical component wherein the region has an optical function in the sense of the present invention, is a region of the optical component which is necessary for the optical component to serve its purpose. A region of an optical component wherein the region has no optical function in the sense of the present invention, is a region of the optical component which is not necessary for the optical component to serve its purpose, i.e. a region of an optical component wherein the region has no optical function can be covered without impacting the optical performance of the optical component. Preferably, the identifier is provided in a region of the optical component without optical function. Herewith, it is advantageously possible to provide a printed optical component with an identifier without compromising the optical performance of the optical component. For example, the identifier may be located away from the optical center of the optical component.

According to another embodiment of the present invention, the optical component comprises an identifier wherein the identifier is realized by certain points inside the optical main body made from identifier printing ink that differs from the printing ink building up the optical body and/or having a refractive index that differs from the refracting index of the material of the main body. In a preferred embodiment of the present invention, the identifier comprises at least one point made up of identifier printing ink. The identifier printing ink differs from the printing ink of the remaining parts of the optical component in at least one parameter. Herewith, an optical component is provided wherein the optical component comprises at least one point inside the optical main body that differs in at least one physical parameter from the surrounding points. In particular, an optical component is provided wherein the optical component comprises at least one point inside the optical main body wherein the refractive index of the at least one print differs from the refractive index of the remaining optical component.

In a preferred embodiment of the present invention, the optical component comprises at least one point inside the optical main body that is visible to the human eye. For example, it is conceivable that the optical component comprises at least one point inside the optical main body that is colored in at least one color. In an alternative embodiment of the present invention, the optical component comprises at least one point inside the optical main body that is invisible to the human eye. For example, it is conceivable that the optical component comprises at least one point inside the optical main body that is only visible to the human eye under irradiation with a certain radiation, e.g. under irradiation with black light (UV-A light). E.g. the optical component comprises at least one point inside the optical main body that is fluorescent. The optical component comprises at least one point inside the optical main body that reflects ultraviolet light, and/or the optical component comprises at least one point inside the optical main body that absorbs ultraviolet light. The optical component comprises at least one point inside the optical main body that reflects infrared light and/or the optical component comprises at least one point inside the optical main body that absorbs infrared light. The optical component comprises at least one point inside the optical main body that is magnetic. The optical component comprises at least one point inside the optical main body that is optically variable. In particular, the optical component comprises at least one point inside the optical main body that reflects various wavelengths in white light differently, depending on the angle of incidence of the light to the surface of the identifier printing ink. The optical component comprises at least one point inside the optical main body that is holographic. For example, the optical component comprises at least one point inside the optical main body that is made of nanocrystalline titania.

In an alternative preferred embodiment of the present invention, the identifier comprises at least one point with a refractive index differing from the refractive index of the optical component, in particular, the identifier may be exposed to UV light of with an exposure time, intensity and/or wavelength differing from the exposure time, intensity and/or wavelength the remaining optical component is exposed to. According to another preferred embodiment of the present invention, the optical component comprises an identifier wherein the identifier comprises a negative or positive relief structure integrated into or onto the surface of the main body.

The surface of the optical component is comprised of all droplets that are not completely surrounded by other droplets of printing ink. I.e. the surface of the printed optical component is comprised of all droplets of the optical component wherein at least one point of the surface of the droplet is not in contact with other droplets of printing ink.

In a preferred embodiment of the present invention, the surface of the optical component is advantageously provided with an identifier wherein the identifier is characterized in that it forms a relief structure or positive relief structure on the surface of the optical component, i.e. the surface of the optical component exhibits a relief in the form of the identifier characterized in that the identifier is being raised above the background plane defined by the surface of the optical component by the height of a single layer of deposited droplets of identifier printing ink or, in an alternative embodiment of the present invention, characterized in that the identifier is being raised above the background plane defined by the surface of the optical component by the height of multiple layers of deposited droplets of identifier printing ink.

In an another preferred embodiment of the present invention, the surface of the optical component is advantageously provided with an identifier wherein the identifier is characterized in that it forms a counter-relief structure or negative relief structure on the surface of the optical component, i.e. the surface of the optical component exhibits a counter-relief in the form of the identifier characterized in that the identifier is being lowered below the background plane defined by the surface of the optical component by the height of a single layer of deposited droplets of printing ink or, in an alternative embodiment of the present invention, characterized in that the identifier is being lowered below the background plane defined by the surface of the optical component by the height of multiple layers of deposited droplets of printing ink.

According to another preferred embodiment of the present invention, the optical component is characterized in that the negative or positive relief structure is realized by certain points made from identifier printing ink that differs from the printing ink building up the optical body and/or having a refractive index that differs from the refracting index of the material of the main body.

In a preferred embodiment of the present invention, an optical component is provided with an identifier wherein the identifier comprises a relief structure or positive relief structure on the surface of the optical component. Preferably, the relief structure or positive relief structure is comprised of identifier printing ink.

In an alternative embodiment of the present invention, an optical component is provided with an identifier wherein the identifier comprises a counter-relief structure or negative relief structure on the surface of the optical component. Preferably, the counter-relief structure or negative relief is at least partially filled with identifier printing ink.

In a preferred embodiment of the present invention, the identifier printing ink differs from the printing ink of the remaining parts of the optical component in at least one parameter. Herewith, an optical component is provided wherein the optical component comprises at least one point on the surface of the optical component that differs in at least one physical parameter from its neighboring points.

In particular, an optical component provided with an identifier is provided wherein the identifier is embodied on the surface of the optical component as a relief structure wherein the relief structure comprises at least one point that has a refractive index differing from the refractive index of the points of the optical component that are not part of the relief structure.

It is conceivable that the relief structure comprises at least one point that is visible to the human eye. For example, it is conceivable that the relief structure comprises at least one point that is colored in at least one color. In an alternative embodiment of the present invention, the relief structure comprises at least one point that is invisible to the human eye. For example, it is conceivable that the relief structure comprises at least one point that is only visible to the human eye under irradiation with a certain radiation, e.g. under irradiation with black light (UV-A light). E.g. the relief structure comprises at least one point that is fluorescent. The relief structure comprises at least one point that reflects ultraviolet light and/or the relief structure comprises at least one point that absorbs ultraviolet light. The relief structure comprises at least one point that reflects infrared light and/or the relief structure comprises at least one point that absorbs infrared light. The relief structure comprises at least one point that is magnetic. The relief structure comprises at least one point that is optically variable. In particular, the relief structure comprises at least one point that reflects various wavelengths in white light differently, depending on the angle of incidence of the light to the surface of the relief structure. The relief structure comprises at least one point that is holographic. For example, the relief structure comprises at least one point that is made of nanocrystalline titania.

In particular, an optical component provided with an identifier is provided wherein the identifier is embodied on the surface of the optical component as a counter-relief structure wherein the filling of the counter-relief structure comprises at least one point that has a refractive index differing from the refractive index of the points of the optical component that are not part of the filling of the counter-relief structure.

It is conceivable that the filling of the counter-relief structure comprises at least one point that is visible to the human eye. For example, it is conceivable that the filling of the counter-relief structure comprises at least one point that is colored in at least one color. In an alternative embodiment of the present invention, the filling of the counter-relief structure comprises at least one point that is invisible to the human eye. For example, it is conceivable that the filling of the counter-relief structure comprises at least one point that is only visible to the human eye under irradiation with a certain radiation, e.g. under irradiation with black light (UV-A light). E.g. the filling of the counter-relief structure comprises at least one point that is fluorescent. The filling of the counter-relief structure comprises at least one point that reflects ultraviolet light and/or the filling of the counter-relief structure comprises at least one point that absorbs ultraviolet light. The filling of the counter-relief structure comprises at least one point that reflects infrared light and/or the filling of the counter-relief structure comprises at least one point that absorbs infrared light. The filling of the counter-relief structure comprises at least one point that is magnetic. The filling of the counter-relief structure comprises at least one point that is optically variable, in particular, the filling of the counter-relief structure comprises at least one point that reflects various wavelengths in white light differently, depending on the angle of incidence of the light to the surface of the filling of the counter-relief structure. The filling of the counter-relief structure comprises at least one point that is holographic. For example, the filling of the counter-relief structure comprises at least one point that is made of nanocrystalline titania.

In an alternative preferred embodiment of the present invention, the identifier realized as a positive or negative relief structure comprises at least one point with a refractive index differing from the refractive index of the optical component. In particular, the identifier realized as a positive or negative relief structure may be exposed to UV light of with an exposure time, intensity and/or wavelength differing from the exposure time, intensity and/or wavelength the remaining optical component is exposed to.

DETAILED DESCRIPTION

Figure 1:
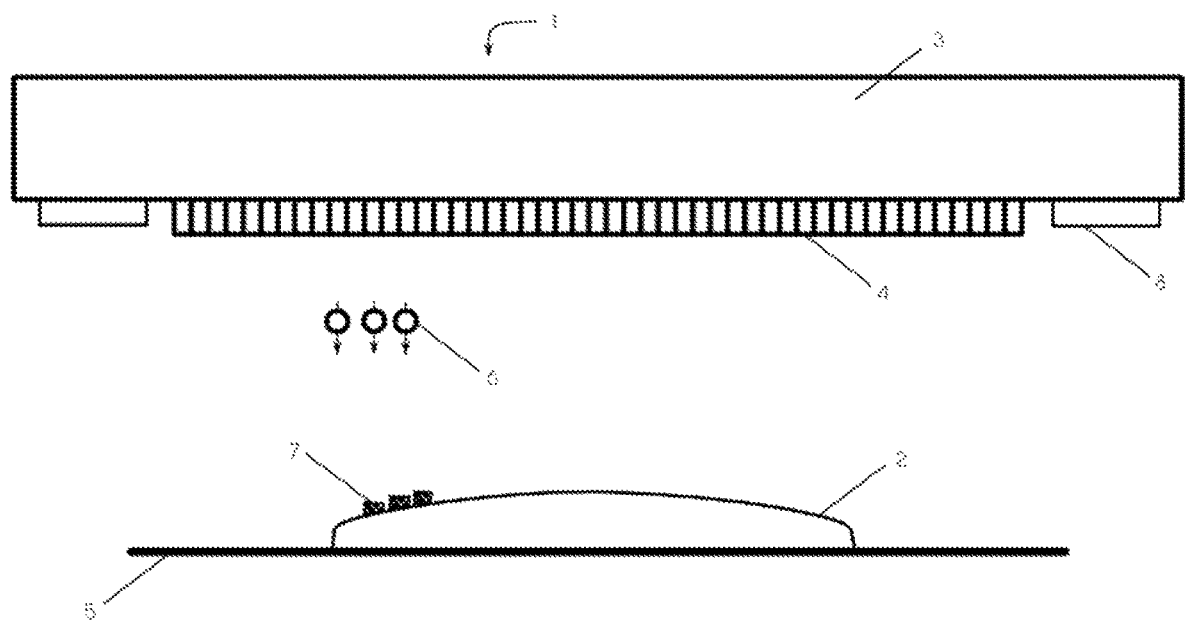
FIG. 1 illustrates schematically an optical component provided with an identifier and a method for providing said identifier by depositing droplets of identifier printing ink side by side and one above the other in several consecutive identifier depositing steps on the surface of the optical component by means of a print head according to an exemplary embodiment of the present invention.

The present invention will be described with respect to particular embodiments and with target to certain drawings but the invention is not limited thereto but only by the claims. The drawings described are only schematic and are non-limiting. In the drawings, the size of some of the elements may be exaggerated and for illustrative purposes may not be drawn to scale.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a method and an optical component 2 are schematically illustrated wherein the optical component is printed in a printing system 1 and wherein the optical component is provided with an identifier 7 through the same printing system 1. In the present example, the identifier is provided onto the surface of the optical component in the form of a positive relief structure.

The printing system 1 comprises a print head 3 equipped with a plurality of ejection nozzles 4. The ejection nozzles 4 are arranged in parallel on the lower side of the print head 3. Each ejection nozzle 4 is in fluid connection with at least one reservoir of printing ink (not shown) and comprises piezoelectric crystals to eject a droplet of printing ink from the print head towards a substrate 5. The printing system 1 can therefore also be referred to as DOD (droplets-on-demand) inkjet printer. In each depositing step, a volley of several droplets are ejected in parallel and simultaneously towards the substrate 5, so that a layer of deposited droplets arranged side by side onto the substrate 5 is generated. With each following depositing step, a further layer of deposited droplets are provided onto the former layer of deposited droplets. After deposition of the droplets, adjacent deposited droplets merge at least partially which each other (the deposited droplets are therefore not illustrated) and are subsequently cured in a curing step by UV-light emitted by LED's (light emitting diodes) 8 of the print head 3. The printing ink comprises a transparent or trans-lucent printing ink, preferably an UV curable liquid monomer becoming a polymer if being cured. The depositing steps and the curing steps are repeated subsequently until a desired three-dimensional optical component 2 is built up.

Each ejection nozzle is in fluid connection with at least a second reservoir of identifier printing ink (not shown) and comprises piezoelectric crystals to eject a droplet 6 of identifier printing ink from the print head towards the optical component 2.

In a preferred embodiment of the present invention, at least one identifier depositing step is carried out after the desired three-dimensional optical component 2 has been built up through subsequently repeated depositing steps and curing steps.

In each identifier depositing step, a volley of several droplets 6 of identifier printing ink are ejected in parallel and simultaneously towards the optical component 2, so that stacks of deposited droplets 6 are generated providing an intermediate pre-identifier in the form of an intermediate positive relief structure on the surface of the optical component 2. With each following identifier depositing step, the height of the intermediate positive relief structure, i.e. the height of the intermediate pre-identifier, is increased by the height of one layer of deposited droplets 6 of identifier printing ink.

After deposition of the droplets 6 of identifier printing ink, adjacent deposited droplets 6 of identifier printing ink merge at least partially which each other (the deposited droplets 6 of identifier are schematically illustrated as the filling of the identifier 7) and are subsequently cured in a curing step by UV-light emitted by LED's (light emitting diodes) 8 of the print head 3. The identifier printing ink comprises a transparent or trans-lucent printing ink, preferably an UV curable liquid monomer becoming a polymer if being cured differing from the printing ink in at least one physical parameter wherein the physical parameters preferably comprise curing time, curing temperature, curing wavelength, viscosity, transmittance, absorption properties, electromagnetic properties and/or optical transparency, physical parameters comprise. The identifier depositing steps and the identifier curing steps are repeated subsequently until a desired three-dimensional identifier 7 is built up.

The print head 3 and in particular the individual ejection nozzles 4 are controlled by the printing controller in dependency of an intensity image (not shown). The intensity image comprises a two-dimensional pattern of different grayscale intensities. The pattern consists of different pixels, wherein each pixel represents a certain position in the three-dimensional optical component 2 to be printed. In particular, each pixel represents a certain position of a two-dimensional projection of the three-dimensional optical component 2 onto the substrate 5. The intensity in each pixel of the intensity image represents the height of the three-dimensional optical component 2 at the corresponding position and therefore the number of droplets of printing ink to be deposited in this position by the corresponding ejection nozzles 4 in subsequent depositing steps. A printing controller now controls each of the plurality of printing nozzles 4 in such a manner that the number of droplets of printing ink deposited in each position on the substrate 5 corresponds to the intensity of the intensity image after all depositing steps have been subsequently performed. The three-dimensional optical component 2 is thereby built up step by step until the amount of printing material deposited in each position corresponds to the intensity of the pixels of the intensity image. In this manner, the droplets of printing ink are deposited side by side and one above the other in order to generate the desired three-dimensional optical component 2. As mentioned above, curing steps are performed optionally between two subsequent depositing steps in order to partially cure the deposited droplets of printing ink and to avoid that the deposited droplets of printing ink completely deliquesce after deposition.

The print head 3 and in particular the individual ejection nozzles 4 are also controlled by the printing controller in dependency of a black-and-white image (not shown). The black-and-white image comprises a two-dimensional black and white pattern. The pattern consists of different pixels, wherein each pixel represents a certain position on the surface of the three-dimensional optical component 2. In particular, the pattern of black pixels takes the shape of the identifier and the pattern of white pixels poses the background against which the identifier shape is being displayed. In the identifier black-and-white image, black pixels encode points on the surface of the optical component 2 where at least one droplet 6 of identifier printing ink shall be deposited and white pixels encode points on the surface of the optical component 2 where no droplet 6 of identifier printing ink shall be deposited. The number of droplets 6 of identifier printing ink deposited at each point on the surface of the optical component 2 determines the height of the identifier 7 to be printed. The print head is provided with the desired height of the identifier in the form of a number. A printing controller now controls each of the plurality of printing nozzles 4 in such a manner that droplets 6 of identifier printing ink are deposited at each point on the surface of the optical component 2 that corresponds to a black pixel in the black-and-white image. The identifier 7 is thereby built up step by step until the amount of identifier printing material deposited in each position corresponds to the desired height the printing controller has been provided with. In this manner, the droplets 6 of identifier printing ink are deposited side by side and one above the other in order to generate the desired three-dimensional identifier 7. As mentioned above, identifier curing steps are performed optionally between two subsequent identifier depositing steps in order to partially cure the deposited droplets 6 of identifier printing ink and to avoid that the deposited droplets of identifier printing ink completely deliquesce after deposition.

Figure 2:
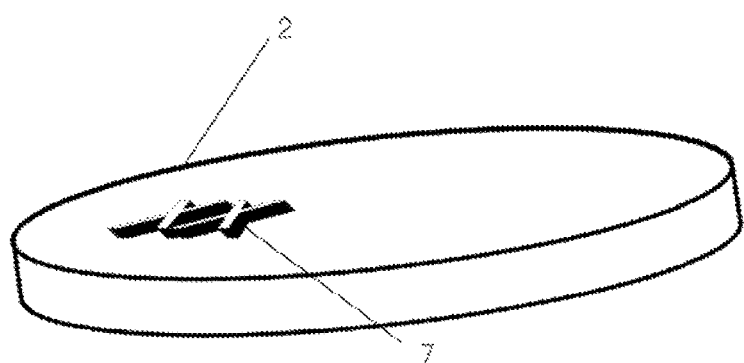
FIG. 2 illustrates schematically an optical component provided with an identifier wherein the identifier is provided onto the surface of the optical component in the form of a positive relief structure.

In FIG. 2, an optical component 2 provided with an identifier 7 is schematically illustrated. The identifier 7 is provided onto the surface of the optical component 2 in the form of a positive relief structure. The identifier is raised above the background plane defined by the surface of the optical component 2 by the height of the identifier 7. The identifier 7 is made up of multiple layers of deposited droplets 6 of identifier printing ink.

Figure 3:
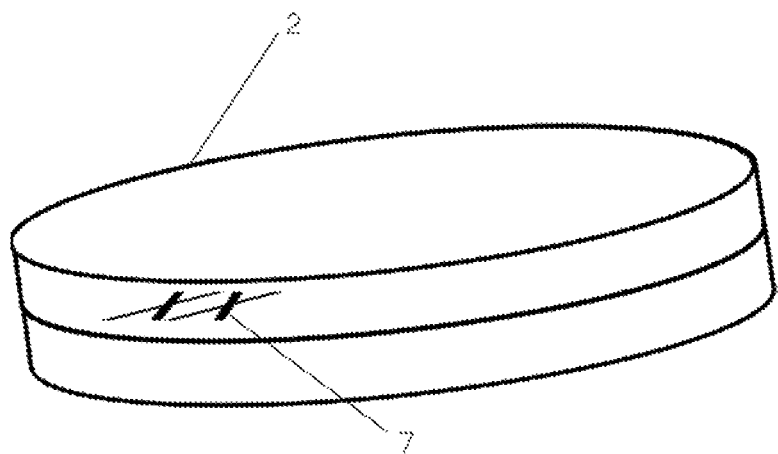
FIG. 3 illustrates schematically an optical component provided with an identifier wherein the identifier is provided onto a layer of an intermediate pre-structure of the optical component wherein the identifier is advantageously structurally integrated into the optical component.

In FIG. 3, an optical component 2 provided with an identifier 7 is schematically illustrated. The identifier 7 is provided onto the surface of an intermediate pre-structure 2' of optical component 2. The identifier is herewith advantageously provided inside the main body of the optical component 2. The identifier is raised above the background plane defined by the surface of the intermediate pre-structure 2' by the height of a single layer of deposited droplets 6 of identifier printing ink.

KEY TO FIGURES

1 Printing System
2 Optical Component
3 Print Head
4 Ejection Nozzle
5 Substrate
6 Droplet
7 Identifier
8 UV light source It is claimed:

1. A method for printing an optical component by depositing droplets of printing ink side by side and one-above the other in several consecutive printing steps by means of a print head, wherein the optical component is provided with an identifier indicating at least one lens parameter, wherein the identifier is structurally integrated into the optical component during at least one printing step.

2. The method according to claim 1, wherein in each printing step a layer of printing material is deposited onto a substrate in a depositing step and at least partially cured in a curing step in order to successively build up the optical component, wherein an identifier printing step for depositing the identifier onto an intermediate pre-structure of the optical component is performed between at least two subsequent printing steps in order to provide the identifier between at least two layers inside the optical component.

3. The method according to claim 2, wherein the identifier printing step comprises an identifier depositing step for depositing identifier printing ink onto the intermediate pre-structure and additionally an identifier curing step for at least partially curing the deposited identifier printing ink.

4. The method according to claim 3, wherein the identifier printing step is performed in such a manner that identifier printing ink that differs from the printing ink generating the layers from which the pre-structure is being generated, is used for building up the identifier.

5. The method according to claim 3, wherein the identifier curing step is performed in such a manner that the deposited identifier is exposed to UV light with an exposure time, an intensity and/or a wavelength range differing from exposure time, intensity and/or wavelength range of the curing steps.

6. The method according to claim 1, wherein in each printing step a layer of printing material is deposited onto a substrate in a depositing step and at least partially cured in a curing step in order to successively build up the optical component, wherein an identifier providing step for generating the identifier into a surface of an intermediate pre-structure of the optical component is performed between at least two subsequent printing steps in order to provide the identifier between at least two layers inside the optical component, wherein the identifier providing step comprises an identifier curing step for additionally curing the surface of the intermediate pre-structure.

7. The method according to claim 1, wherein in each printing step a layer of printing material is deposited onto a substrate in a depositing step and at least partially cured in a curing step in order to successively build up the optical component, wherein an identifier printing step for depositing the identifier onto a surface of the optical component is performed after a last printing step preceding finalizing printing steps wherein the identifier is integrated into one or more last layers of the optical component in a form of a positive relief structure or wherein an identifier providing step for depositing the identifier into the surface of the optical component is performed after the last printing step preceding the finalizing printing steps wherein the identifier is integrated into the last layers of the optical component in a form of a negative relief structure.

8. The method according to claim 7, wherein the negative relief structure is at least partially filled with an identifier printing ink that preferably differs from the printing ink generating the layers from which the optical component is generated, during or after the identifier providing step.

9. The method according to claim 7, wherein interspaces of the positive relief structure are at least partially filled with printing ink during or after the identifier printing step.

10. The method according to claim 7, wherein the identifier printing step is performed in such a manner that the positive relief structure is built up with an identifier printing ink that differs from the printing ink generating the layers that build up the optical component.

11. The method according to claim 1, wherein the optical component is an ophthalmic lens.

12. An optical component comprising an optical main body being built in an inkjet printing process of depositing droplets of printing ink side by side and one above the other in several consecutive printing steps, wherein the optical component comprises at least one identifier indicating at least one lens parameter, wherein the identifier is structurally integrated into the optical main body during at least one printing step, and wherein the identifier is realized by certain points inside the optical main body made from identifier printing ink that differs from the printing ink building up the optical body.

13. The optical component according to claim 12, wherein the identifier is confined to a region of the optical component, wherein the region of the optical component does not have an optical function.

14. The optical component according to claim 12, wherein the optical component is an ophthalmic lens.

15. The optical component according to claim 12, wherein the identifier is human- or machine-readable.

16. The optical component according to claim 12, wherein the identifier is a linear barcode, a 2D matrix code, a 3D code, an encryption key, a graphic image, or a holographic image.

17. An optical component comprising an optical main body being built in an inkjet printing process of depositing droplets of printing ink side by side and one above the other in several consecutive printing steps, wherein the optical component comprises at least one identifier indicating at least one lens parameter, wherein the identifier is provided during an identifier providing step by depositing droplets of printing ink side by side and one above the other on all points on a surface of the optical component except at those points where the identifier is to be located, wherein the identifier is structurally integrated into the optical main body during at least one printing step, and wherein the identifier comprises a negative relief structure integrated into a surface of the main body.

18. The optical component according to claim 17, wherein the negative relief structure is realized by certain points made from identifier printing ink that differs from the printing ink building up the optical body and/or having a refractive index that differs from a refracting index of material of the main body.

19. The optical component according to claim 17, wherein the optical component is an ophthalmic lens.

\* \* \* \* \*